W. E. STOY.
CLUTCH.
APPLICATION FILED MAY 4, 1920.
1,379,728.
Patented May 31, 1921.
2 SHEETS—SHEET 2.
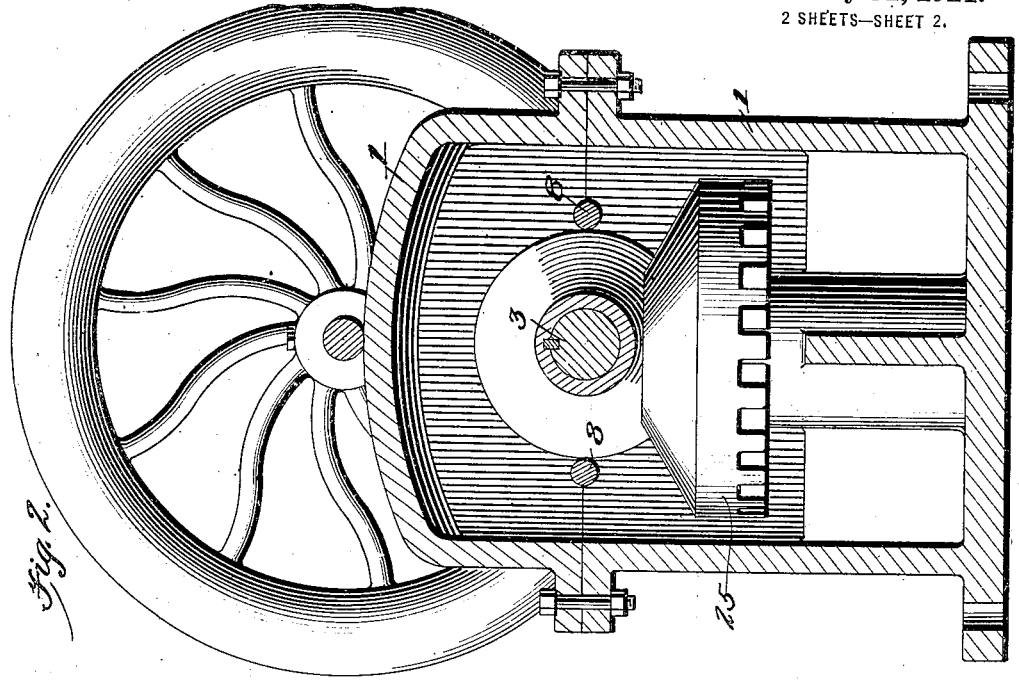
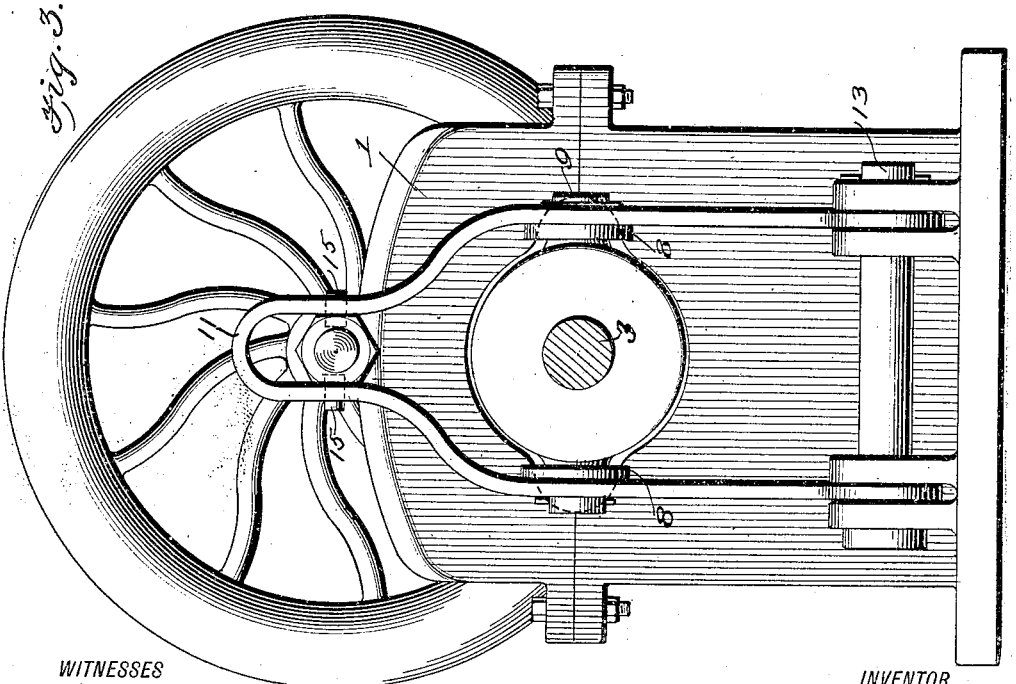
WITNESSES
R. E. Rousseau
C. E. Trainor
INVENTOR
W. E. Stoy,
BY
ATTORNEYS

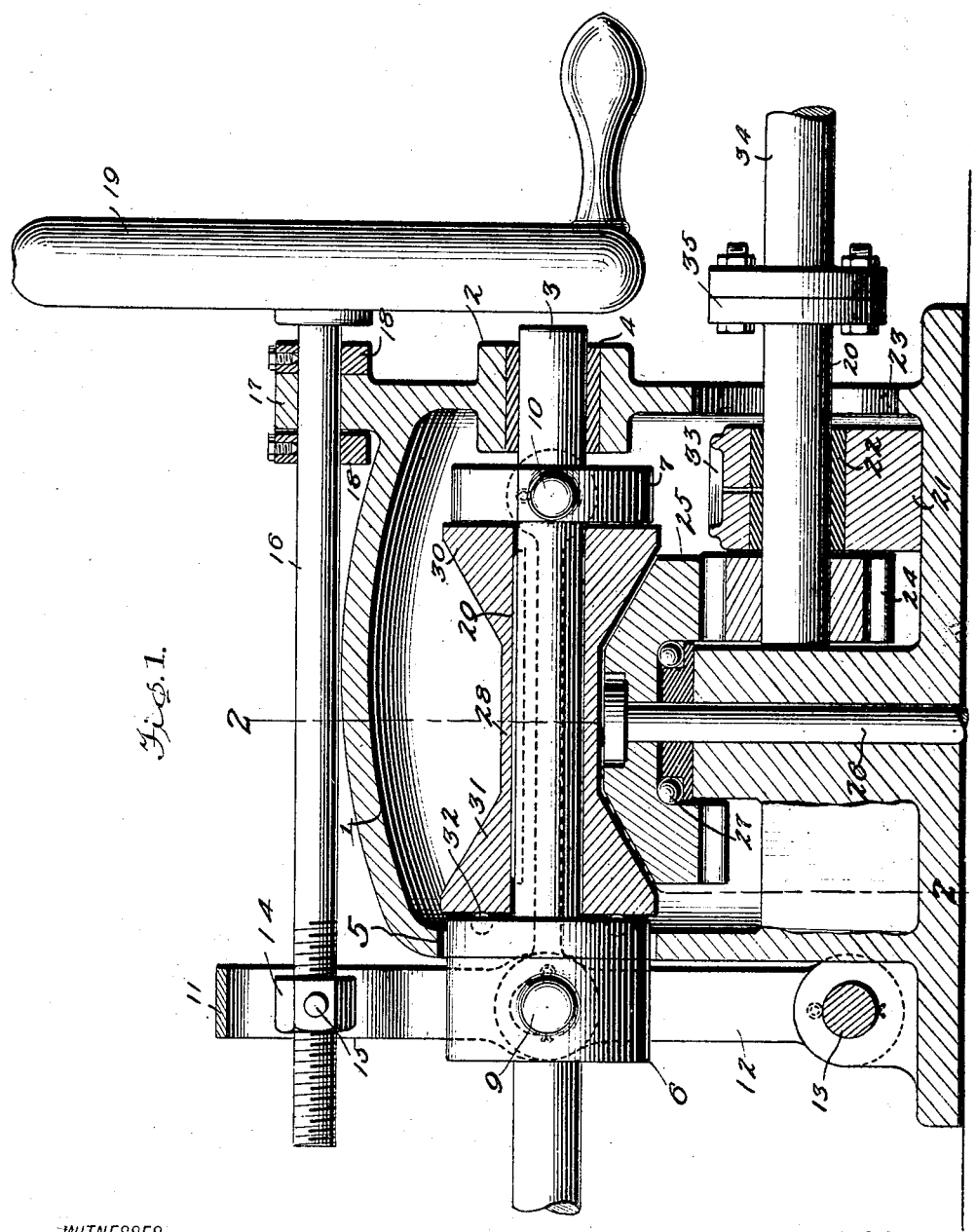

UNITED STATES PATENT OFFICE.

WILLIAM EDWARD STOY, OF JUNEAU, TERRITORY OF ALASKA.

CLUTCH.

1,379,728.   Specification of Letters Patent.   Patented May 31, 1921.

Application filed May 4, 1920. Serial No. 378,736.

*To all whom it may concern:*

Be it known that I, WILLIAM EDWARD STOY, a citizen of the United States, and a resident of Juneau, Territory of Alaska, have invented certain new and useful Improvements in Clutches, of which the following is a specification.

My invention is an improvement in clutches, and the invention has for its object to provide a reversible frictional clutch for use in mobile or stationary machinery, wherein the speeds forward and backward may be obtained by merely moving the clutch operating mechanism in opposite directions.

In the drawings:

Figure 1 is a longitudinal vertical section of the improved clutch;

Fig. 2 is a section on the line 2—2 of Fig. 1;

Fig. 3 is an end view of Fig. 1.

In the present embodiment of the invention, a suitable casing 1 is provided, having at one end a bearing 2 for receiving the drive or motor shaft 3, a bushing 4 being arranged between the bearing and the shaft. At the opposite end of the casing the shaft extends through an opening 5 in the casing wall, and upon the shaft at this point there is mounted a collar 6 which is slidable on the shaft. A second collar 7 is mounted on the shaft near the bearing 2, and these collars are connected by links 8, each link being pivoted at one end to one collar and at the other to the other, the links having eyes at their ends, as shown, for engaging journal pins 9 and 10 on the respective collars.

A yoke comprising a body 11 and arms 12 is mounted at the end adjacent to the collar 6, the arms of the yoke being pivoted to the base of the casing 1, as indicated at 13, and intermediate their ends the arms are pivoted on the journal pins 9 before mentioned. The body 11 of the yoke extends above the casing, as shown in Figs. 1 and 2, and a nut 14 is pivoted between the arms at the body, the nut having journal pins 15 extending in opposite directions, which are journaled in the arms, the said arms being offset inwardly above the shaft 3, as shown in Fig. 3.

A rod 16 is threaded through the nut, the said rod being journaled in a bearing lug 17 extending upwardly from the casing and having collars 18 secured to the opposite sides thereof to prevent longitudinal movement of the shaft in the collar, and the shaft has a hand wheel 19 at the end remote from the nut for turning the same. It will be evident from the description that when the shaft 16 is turned by means of the hand wheel the yoke 11 will be swung to move the collars 6 and 7 longitudinally of the shaft 3. The driven shaft 20 is journaled in a bearing block 21 in the casing, a bushing 22 being arranged between the block and the shaft, and the said shaft extends through an opening 23 in the adjacent end of the casing.

A pinion 24 is secured to the inner end of the shaft, and this pinion meshes with a crown wheel 25 on a vertical shaft 26 journaled in the casing. A ball bearing 27 is arranged between the crown wheel and the bearing in which the shaft 26 is journaled, and the upper face of this crown wheel, as shown in Figs. 1 and 2, is tapered or beveled.

A sleeve 28 is feathered on the shaft 3, between the collar 6 and 7, by means of a key or feather 29, and the ends of this sleeve are enlarged and tapered, as shown, to coöperate with the beveled surface of the crown wheel. The peripheral faces of these tapered portions 30 and 31 of the sleeve are spaced apart from each other at such a distance that they will engage the beveled surface of the crown wheel alternately, one being always out of engagement when the other is engaged with the crown wheel.

The operation of the device is as follows:

In order that the shaft 20 may rotate with the shaft 3 in the same direction, the sleeve will be moved until the portion 31 thereof engages the beveled surface of the crown wheel. To reverse, the sleeve is moved in the opposite direction, to disengage the surface 31 and engage the surface 30 of the crown wheel. Now the shafts 3 and 20 will rotate in opposite directions. The sleeve is moved in the opposite direction by means of the hand wheel 19. When the shaft 16 is rotated by the hand wheel the nut 14 will be moved longitudinally of the shaft, the direction depending upon the direction of rotation of the shaft, and the yoke will be swung therewith. Since the sleeve is mounted between the collars 6 and 7 which are connected with the yoke the sleeve will be moved with the yoke and the collars.

Referring to Fig. 1, it will be seen that the ball bearings 32 are arranged between the ends of the sleeve and the collars 6 and 7. The upper end of the block 21 is recessed, as shown at 33, and a vertical passage is provided from the recess to the shaft 20, to permit lubrication of the said shaft. The shaft 20 may be connected with the propeller shaft, indicated at 34, by the connection indicated at 35, and it will be noticed that the casing 1 has a removable top for permitting inspection of the mechanism of the clutch.

It will be understood from the description that the clutch is so designed that a longitudinal movement of its operating parts in one direction will cause the driven shaft to revolve in the same direction as the driving shaft, while a movement in the other direction will cause the driven shaft to revolve in a reverse direction to that of the driving shaft, thus transmitting power in either direction to the machine or propeller shaft.

When the operating parts of the clutch are in neutral position, the driving shaft rotates freely without imparting motion to the driven shaft. Preferably, the housing of the clutch is made in two parts, suitably bolted together, for permitting access for inspection or repair.

I claim:

1. A device of the character specified comprising, in combination with the drive shaft and the driven shaft, of means in which said shafts are journaled for supporting them in parallelism, a countershaft arranged at right angles to the said shafts and carrying a crown wheel between the shafts, the driven shaft having a pinion meshing with the crown wheel, and the drive shaft having a sleeve feathered thereon and provided at each end with enlargements tapering outwardly from the sleeve, the adjacent face of the crown wheel being beveled to alternately engage the enlarged ends of the sleeve when the sleeve is moved longitudinally, means for moving the sleeve, said means comprising collars arranged at the ends of the sleeve and slidable on the shaft, a connection between the collars, means connected with one of the collars for moving said collars, said moving means comprising a yoke pivoted to the support for the shafts and pivoted to the adjacent collar, a shaft journaled above the drive shaft and having means for turning the same, and a nut pivoted to the yoke and threaded on to the shaft.

2. A device of the character specified comprising in combination with the drive shaft and the driven shaft, of means in which said shafts are journaled for supporting them in parallelism, a countershaft arranged at right angles to the said shafts and carrying a crown wheel between the shafts, the driven shaft having a pinion meshing with the crown wheel and the drive shaft having a sleeve feathered thereon and provided at each end with enlargements tapering outwardly from the sleeve, the adjacent face of the crown wheel being beveled to alternately engage the enlarged ends of the sleeve when the sleeve is moved longitudinally, means for moving the sleeve, said means comprising collars arranged at the ends of the sleeve and slidable on the shaft, a connection between the collars, and means connected with one of the collars for moving said collars.

3. A device of the character specified comprising in combination with the drive shaft and the driven shaft, of means in which said shafts are journaled for supporting them in parallelism, a countershaft arranged at right angles to the said shafts and carrying a crown wheel between the shafts, the driven shaft having a pinion meshing with the crown wheel, and the drive shaft having a sleeve feathered thereon and provided at each end with enlargements tapering outwardly from the sleeve, the adjacent face of the crown wheel being beveled to alternately engage the enlarged ends of the sleeve when the sleeve is moved longitudinally, and means for moving the sleeve.

4. A device of the character specified comprising in combination with the drive shaft and the driven shaft, a countershaft arranged at right angles to the said shafts and carrying a crown wheel between the shafts, the driven shaft having a pinion meshing with the crown wheel, and the drive shaft having a sleeve feathered thereon and provided at each end with enlargements tapering outwardly from the sleeve, the adjacent face of the crown wheel being beveled to alternately engage the enlarged ends of the sleeve when the sleeve is moved longitudinally, and means for moving the sleeve.

5. A device of the character specified comprising in combination with the drive shaft and the driven shaft, a crown wheel between the shafts, the driven shaft having a pinion meshing with the crown wheel, and the drive shaft having a sleeve feathered thereon and provided at each end with enlargements tapering outwardly from the sleeve, the adjacent face of the crown wheel being beveled to alternately engage the enlarged ends of the sleeve when the sleeve is moved longitudinally, and means for moving the sleeve.

WILLIAM EDWARD STOY.